(12) United States Patent
Brady et al.

(10) Patent No.: US 10,599,874 B2
(45) Date of Patent: *Mar. 24, 2020

(54) CONTAINER UPDATE SYSTEM

(71) Applicant: International Business Machines Corporation, Armonk, NY (US)

(72) Inventors: Simon J. Brady, Dublin (IE); Jonas E. Bryllert, Swords (IE); John V. Delaney, Kildalkey (IE); Barry Hollywood, Navan (IE); Gerhard H. Widmayer, Herrenberg (DE); Clea A. Zolotow, Key West, FL (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/180,229

(22) Filed: Nov. 5, 2018

(65) Prior Publication Data

US 2019/0080118 A1 Mar. 14, 2019

Related U.S. Application Data

(63) Continuation of application No. 15/354,564, filed on Nov. 17, 2016, now Pat. No. 10,169,614.

(51) Int. Cl.
| | |
|---|---|
| *G06F 8/65* | (2018.01) |
| *G06F 21/64* | (2013.01) |
| *G06F 9/455* | (2018.01) |
| *H04L 9/32* | (2006.01) |
| *H04L 9/06* | (2006.01) |

(52) U.S. Cl.
CPC .............. *G06F 21/64* (2013.01); *G06F 8/65* (2013.01); *G06F 9/45558* (2013.01); *H04L 9/0643* (2013.01); *H04L 9/3236* (2013.01); *H04L 9/3297* (2013.01); *G06F 2009/45587* (2013.01); *H04L 2209/38* (2013.01)

(58) Field of Classification Search
CPC ........................................................ G06F 8/65
USPC ........................................................ 717/168
See application file for complete search history.

(56) References Cited

U.S. PATENT DOCUMENTS

| | | | |
|---|---|---|---|
| 10,313,134 B2 | 6/2019 | Smith et al. | |
| 2015/0172255 A1 | 6/2015 | Warnez et al. | |
| 2016/0140653 A1* | 5/2016 | McKenzie | G06Q 40/02 |
| | | | 705/69 |
| 2017/0031676 A1 | 2/2017 | Cecchetti et al. | |

(Continued)

OTHER PUBLICATIONS

Anonymous, GitHub, "A Next-Generation Smart Contract and Decentralized Application Platform", Ethereum, Wiki Whitepaper, github.com, captured by Wayback Machine Internet Active (archive.org) on Jan. 15, 2016.

(Continued)

*Primary Examiner* — Qing Chen
*Assistant Examiner* — Clint Thatcher

(57) ABSTRACT

A computer implemented method comprising operating a software container, the software container including a blockchain subsystem and a blockchain ledger, generating a blockchain entry by executing a hashing function on a current state of the software container and a last entry in the blockchain ledger, updating the blockchain ledger with the generated blockchain entry, and transmitting the generated blockchain entry to one or more connected software containers.

20 Claims, 10 Drawing Sheets

(56) References Cited

U.S. PATENT DOCUMENTS

| | | |
|---|---|---|
| 2017/0116693 A1 | 4/2017 | Rae et al. |
| 2017/0161439 A1 | 6/2017 | Raduchel et al. |
| 2017/0264684 A1 | 9/2017 | Spillane et al. |
| 2017/0279774 A1 | 9/2017 | Booz et al. |
| 2017/0345011 A1 | 11/2017 | Salami et al. |
| 2018/0176262 A1 | 6/2018 | Kavi |
| 2018/0204191 A1* | 7/2018 | Wilson ............... G06Q 20/3829 |
| 2018/0204192 A1* | 7/2018 | Whaley ............. G06Q 20/0658 |
| 2019/0036678 A1 | 1/2019 | Ahmed |

OTHER PUBLICATIONS

Anonymous; Docker Overview [Parts One and Two]; Deis.com website [full URL in ref.]; Mar. 29, 2016.
Berkeley, "The Promise of the Blockchain"; The Economist website (economist.com) [full URL in ref.]; Oct. 31, 2015.
Buterin; "On Public and Private Blockchains"; Ethereum.org website [full URL in ref.]; Aug. 7, 2015.
Fernandes; "Building an Ethereum Playground with Docker (Parts 1-4 )"; Medium.com website [full URL in ref.]; Sep. 17, 2016.
Nakamoto, "Bitcoin a Peer-to-Peer Electronic Cash System"; Amazon Web Services website (amazonaws.com) [full URL in ref.]; Nov. 21, 2013.
Nakamoto; "Bitcoin: A Peer-to-Peer Electronic Cash System"; Bitcoin website (www.bitcoin.org) as captured by the Wayback Machine Internet Archive (archive.org); Jul. 4, 2010.
Preethi Kasireddy; A Beginner-Friendly Introduction to Containers, VMs, and Docker; Medium.com website Mar. 4, 2016.
Xu et al., The Blockchain as a Software Connector, Source: https://ssrg.nicta.com, SSRG.

* cited by examiner

US 10,599,874 B2

CONTAINER UPDATE SYSTEM

FIELD

The present application relates to a method, a system and a computer program product that operate a software container.

BACKGROUND

Software containers give each application running on a server its own, isolated environment to run while sharing a host server's operating system. Containers make it easier to move applications from individual machines to the cloud, for example, that serve those applications to customers, especially in response to demand. A blockchain is a distributed database that maintains a continuously-growing list of records called blocks. Each block contains a timestamp and a link to a previous block. By design blockchains are inherently resistant to modification of data. Decentralised consensus can therefore be achieved which offers the potential of trade disintermediation. What is needed is a method, a system and a computer program product that opersate a software container and a blockchain in conjunction with one another.

SUMMARY

According to a first aspect of the present application, there is provided a computer implemented method comprising operating a software container, the software container including a blockchain subsystem and a blockchain ledger, generating a blockchain entry by executing a hashing function on the current state of the software container and the last entry in the blockchain ledger, updating the blockchain ledger with the generated blockchain entry, and transmitting the generated blockchain entry to one or more connected software containers.

According to a second aspect of the present application, there is provided a system comprising a processor arranged to operate a software container, the software container including a blockchain subsystem and a blockchain ledger, generate a blockchain entry by executing a hashing function on the current state of the software container and the last entry in the blockchain ledger, update the blockchain ledger with the generated blockchain entry, and transmit the generated blockchain entry to one or more connected software containers.

According to a third aspect of the present application, there is provided a computer program product for controlling a system, the computer program product comprising a computer readable storage medium having program instructions embodied therewith, the program instructions executable by a processor to cause the processor to operate a software container, the software container including a blockchain subsystem and a blockchain ledger, generate a blockchain entry by executing a hashing function on the current state of the software container and the last entry in the blockchain ledger, update the blockchain ledger with the generated blockchain entry, and transmit the generated blockchain entry to one or more connected software containers.

BRIEF DESCRIPTION OF THE DRAWINGS

Preferred embodiments of the present application will now be described, by way of example only, with reference to the following drawings, in which.

DETAILED DESCRIPTION

Figure 1:
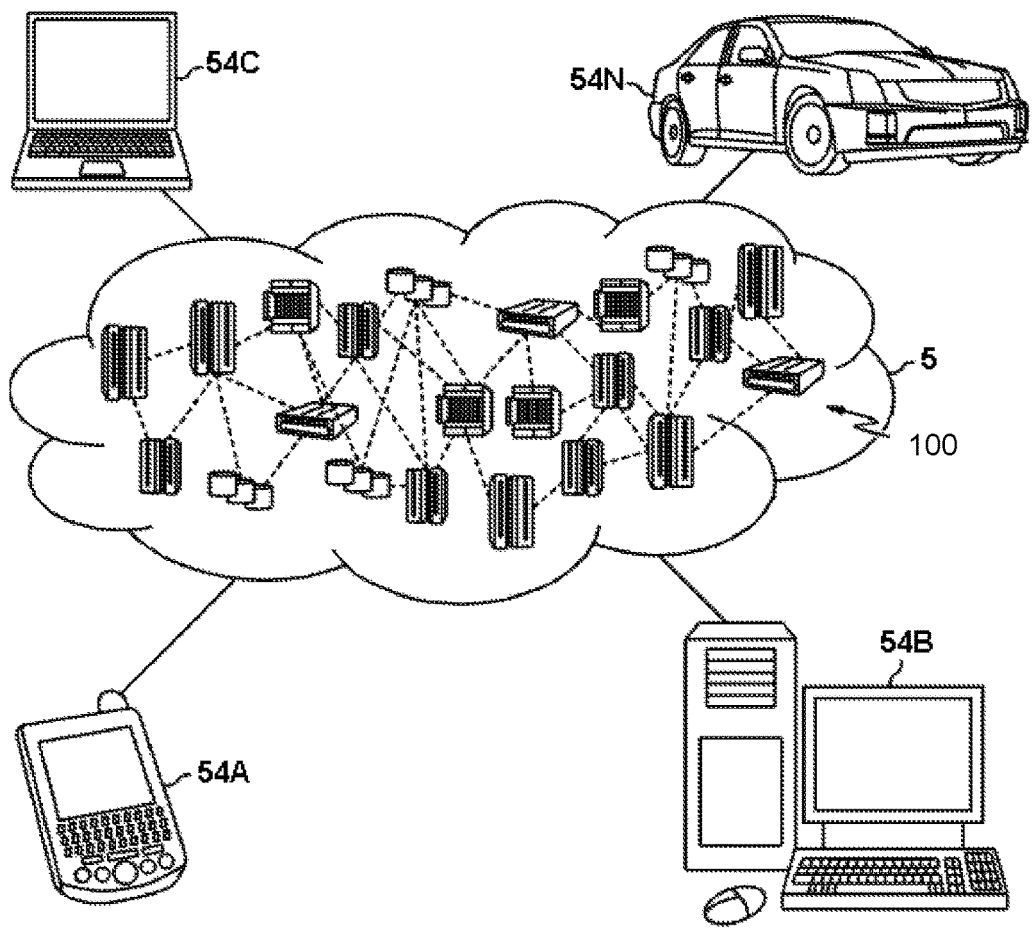
FIG. 1 depicts a cloud computing environment according to an embodiment of the present application.

It is to be understood that although this disclosure includes a detailed description on cloud computing, implementation of the teachings recited herein are not limited to a cloud computing environment. Rather, embodiments of the present application are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 100 and cloud computing environment 50 can communicate with any type of computerized device over any type of network and/or network addressable connection (e.g., using a web browser).

Figure 2:
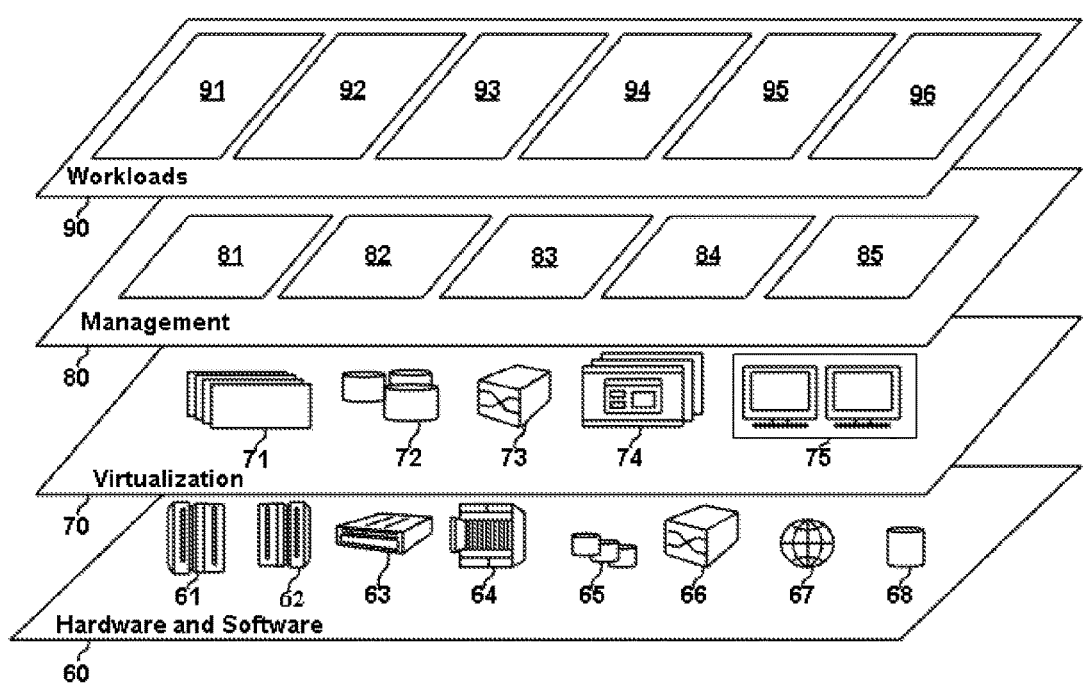
FIG. 2 depicts abstraction model layers according to an embodiment of the present application.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the application are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfilment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Figure 3:
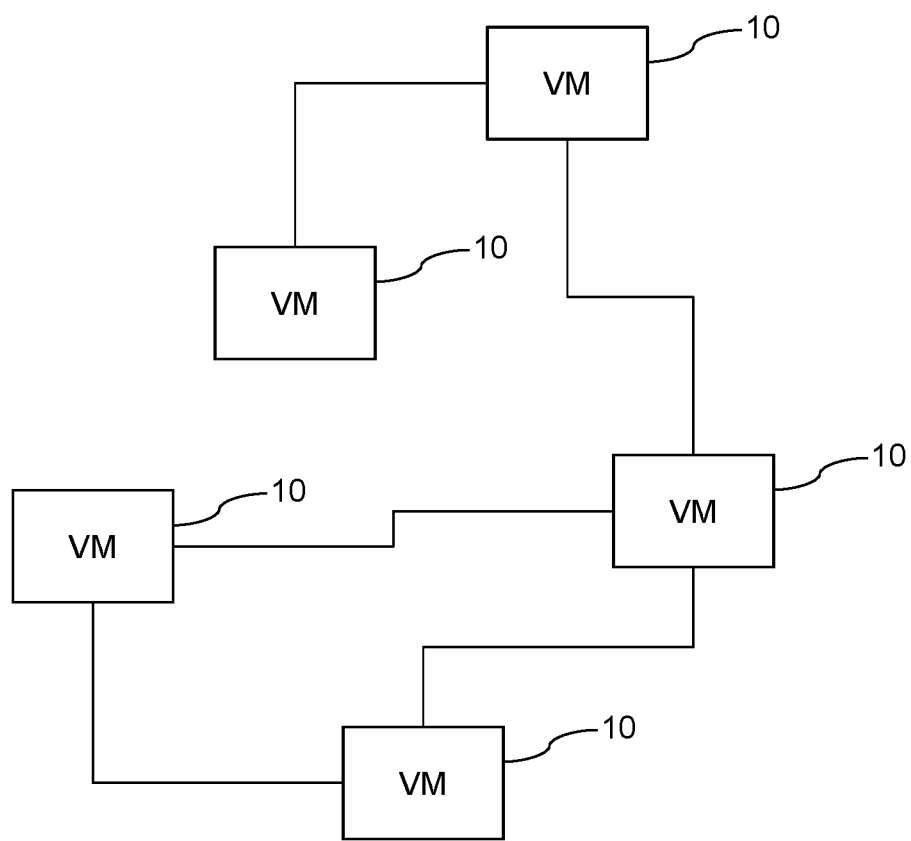
FIG. 3 is a schematic diagram of a network of software containers.

FIG. 3 is a schematic diagram of a network of software containers 10. A software container 10 is a virtual machine, which is a piece of software that is essentially a complete filesystem that contains everything needed to operate and can include for example, code, runtime, system tools and system libraries. Software containers 10 can be run by a server within the cloud computing system and multiple connected software containers 10 can be run by the same piece of physical hardware or the software containers 10 can be distributed amongst different physical components. Software containers 10 provide virtualisation of the resources available and allow an end user to interact with a software container 10 without having to be aware of the underlying hardware running the software container 10.

Software containers 10 are portable and can be moved between physical locations, depending upon the hardware resources that are available and being used and also taking into account such matters as secure backups of data and hardware failures and so on. A large organisation may have many hundreds, even thousands of software containers 10 running at the same time and the management of these software containers 10 is a significant task, particularly in two areas, software updating and security. Software updates are applied to all modern software instances such as software containers 10 on a regular basis and the keeping track of such very large numbers of software containers 10 and their current status is not a trivial task. Knowing whether an update occurred correctly for every individual container 10 is often very difficult to verify.

Similarly the security of software containers 10 is a serious issue, since common software attacks can be made on software containers 10 by inserting rogue code into a software container 10 for the purpose of changing the operation of the software container 10. A malicious third party can attack a large organisation that is using software containers 10, for example for the purpose of obtaining confidential information or for performing irregular financial transactions. The ability accurately to detect when a software container 10 has been the subject of an attack by a third party to alter the operation of the software container 10 is of vital importance to the organisation that is operating the software containers 10.

Figure 4:
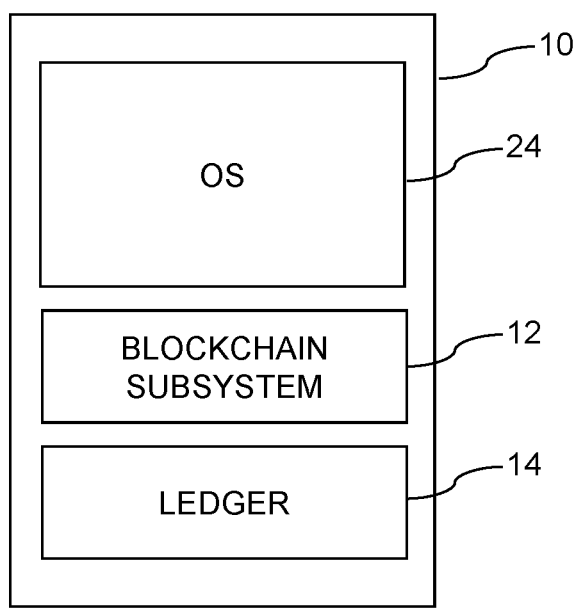
FIG. 4 is a schematic diagram of a software container.

In order to improve the security and reliability of the software containers 10, a blockchain based system is used. Each software container 10 has an operating system 24 and includes a blockchain subsystem 12 and a blockchain ledger 14, as shown in FIG. 4. The network of software containers 10 uses an innovative method to verify the integrity and currency of the container based software system using the tamper proof distributed blockchain ledger 14. Each container 10 within the system has a copy of the ledger 14 and changes to the ledger 14 are populated through the different software containers 10 so that each container 10 has access to the up-to-date version of the ledger 14.

The distributed ledger 14 used in the software container 10 is a blockchain based system. A blockchain is a distributed tamper proof ledger 14 that is stored in "blocks". Blocks are added in a linear timestamped and chronological order. Each block contains the hash of the block before, linking each block to its predecessor. This hash is the proof of work, a moderately hard calculation that makes it difficult for someone to completely recalculate the entire blockchain from scratch. Each block contains the currency of the software updates and shows which updates are applied to which container 10. When currency differentials arise, they can then be solved by automatically installing the software update or taking the container 10 offline if the container 10 experiences issues in the update.

As more and more systems are moved onto cloud based infrastructure, the security and currency of virtual machines and containers 10 has increasingly become important. Virtual machines are often distributed as containers, which is virtualized user-spaces that share the kernel of a server (a hypervisor) with multiple other containers (in systems such as Docker). Due to the complexity of container based systems, maintaining a secure and current infrastructure has become difficult to manage. A business may have container based systems spread across multiple providers, each on multiple servers. This improved system using the blockchain ledger 14 allows a business to isolate and secure a set of containers using a distributed system which will not be affected even if the underlying hypervisor is also compromised. The blocks within the ledger 14 capture the current status of individual containers 10 and can be used to verify the status of individual containers 10.

Figure 5:
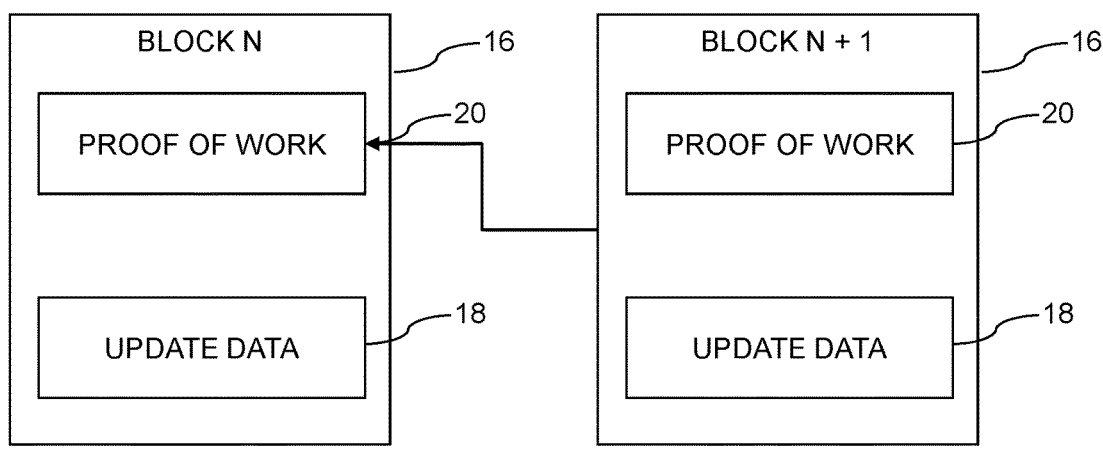
FIG. 5 is a schematic diagram of blocks of a blockchain ledger.

FIG. 5 illustrates a series of blocks 16 stored within the blockchain ledger 14. Each block 16 is analogous to a row in a spreadsheet which contains specific information and also a reference to the previous row in the spreadsheet. Each block 16 contains data 18 and a proof of work component 20 that looks back to the previous block 16. The blocks 16 form a chain, since each block 16 contains information from the previous block 16. A blockchain entry 16 is created by executing a hashing function on the current state of a software container 10 and the last entry 16 in the blockchain ledger 14. The blockchain subsystem 12 within the software container is the entity that creates the blockchain entries 16. The current state of a software container 10 is defined with respect to a predefined set of directories within the software container 10. The contents of these directories are the raw input to a hashing function which produces an output which is the hash that is stored in the blockchain entry 16. A hashing function is a function that takes an input of any size and produces an essentially encrypted output of a defined length. The original input cannot be determined from the output of the hashing function.

A business or organisation can use multiple container based operating systems running across multiple hypervisors. The containers 10 all share a blockchain based distributed ledger 14. Each container 10 runs a blockchain subsystem 12 for this purpose and maintains a copy of the entire blockchain ledger 14. Periodic updates for the blockchain ledger 14 are broadcast across the entire network of containers 10. This ledger 14 is "public" only to the network of containers 10. Each block 16 (a metaphoric database entry) in the blockchain ledger 14 stores cryptographically hashed information pertaining to the current state of one of the containers 10 in the network. Each container 10 can query its own status or the status of one its sibling containers 10 and compare this data to what is stored in the blockchain ledger 14. As a container 10 undergoes software updates, the blockchain ledger 14 is updated with new information. At certain points, a container 10 can be challenged or audited against the blockchain ledger 14 and if the container 10 fails the audit, the container 10 in question can be removed ("firewalled") from the network.

The system has a number of advantages. The system provides a way for a business to secure its own container based systems in isolation to the underlying hypervisor and/or container host system(s). This reduces dependency on particular hosting providers. The system provides a method for a container 10 to perform a diagnostic on itself or on another container 10 that does not depend on one system that may be compromised. As the blockchain ledger 14 is distributed across the network, this decreases the chances of the entire network being compromised. The system does not rely on one single database server that could itself be compromised. The blockchain ledger 14 itself provides a known state for the container based network that does not depend on any one container 10. This system provides an auditable, reactive platform for immutable infrastructure.

The system offers a way to secure and audit a collection of container based systems across multiple hosting providers that also allows for ring-fencing of non-updated systems. In general it is important that all similar systems have the same software updates and then behave in the same way, even when behind a load balancer, for example. A load balancer is a device that distributes network or application traffic across a number of servers. Load balancers are used to increase capacity (concurrent users) and reliability of applications. An application (a website for example) could be made up of multiple servers. As network traffic increases, the load balancer would call new servers into existence and spread the load onto these new servers. All of these servers are identical, just copies of some initial set-up, a container. The system allows these containers to be kept identical, even after updates.

The system provides a network of container based operating systems that will each run a blockchain software subsystem 12. This subsystem 12 will store and manage a copy of a blockchain based ledger 14 either as an encrypted file or as a database. Each container 10 will manage its own copy of the ledger 14. The blockchain software subsystem 12 will have the ability to identify other containers 10 in the network and broadcast and receive messages relating to the ledger 14. Each container 10 will also contain software to audit certain targeted subdirectories on the container 10 when requested. These directories may include the directories /etc, /bin and /sbin. A tool such as md5deep (see http://md5deep.sourceforge.net/) can be used to create set of hashes for these directories. A new block 16 in the blockchain ledger 14 would contain these hashes and the identity of the container 10. These values could be used with the hash of the previous block 16 to generate the hash of the new block 16 thus linking the blocks 16 together.

Figure 6:
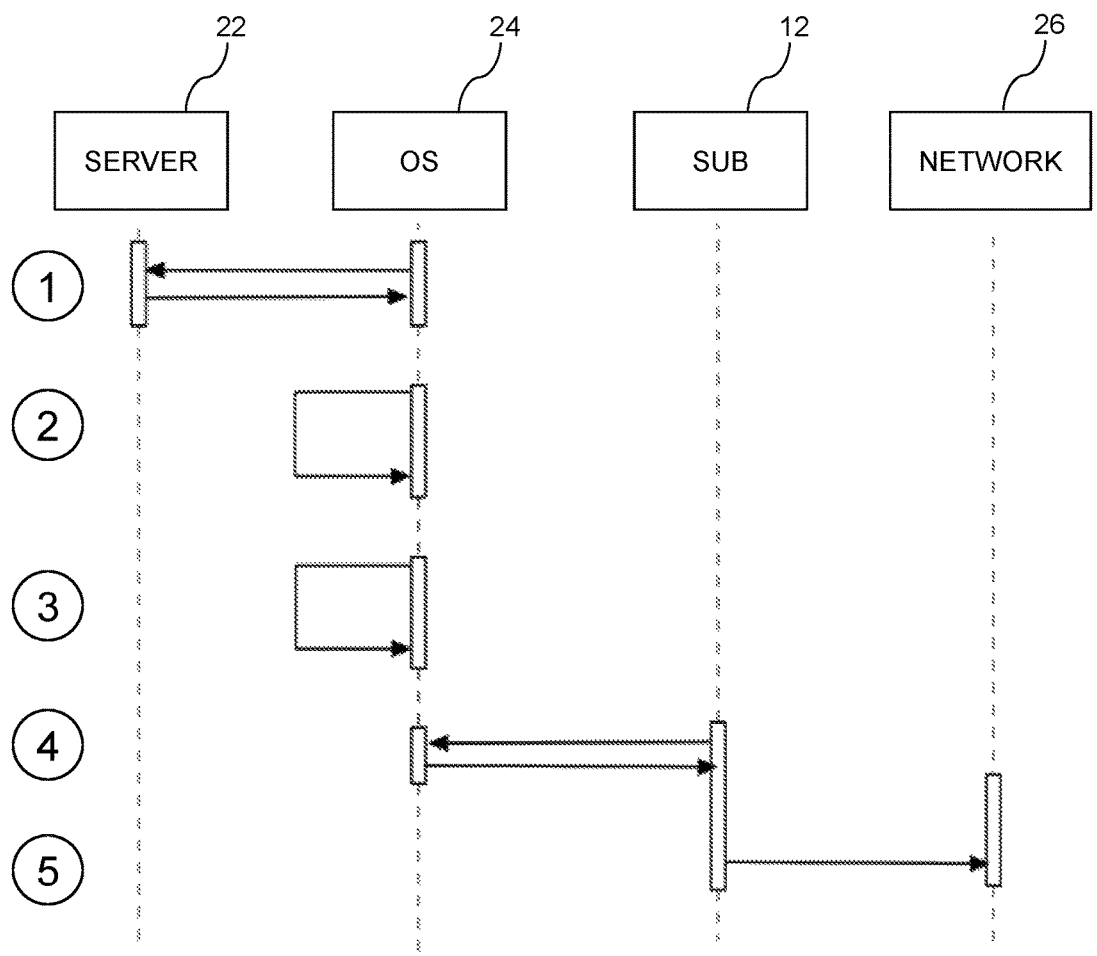
FIG. 6 is a process diagram showing a method of creating a new block in the blockchain ledger.

FIG. 6 illustrates the communication between different components during the creation of a new block 16 in the blockchain ledger 14. A container 10 will add a new block 16 as illustrated in this Figure, once a software update has been run. The four components represented in the Figure, from left to right are, an external update server 22, a container operating system 24, the blockchain subsystem 12 and the external network architecture 26. Both of the container operating system 24 and the blockchain subsystem 12 are contained within the same container 10. The network architecture 26 is a proxy of the other containers 10 that in communication with container 10 that is being updated.

The first action in the communication diagram is (1), which is the container operating system 24 requesting one or more software updates from the external server 22 and receiving these updates back from the update server 22. The next action (2) comprises the container operating system 24 installing the software updates on the system. This is followed by the action (3) which comprises the container operating system 24 creating a set of cryptographic hashes of several target directories within the container 10. The next action (4) is the container operating system 24 contacting the blockchain subsystem 12 and a new block 16 is created using the cryptographic hashes. At action (5) the updated block 16 is broadcast to the other containers 10 in the network 26.

Figure 7:
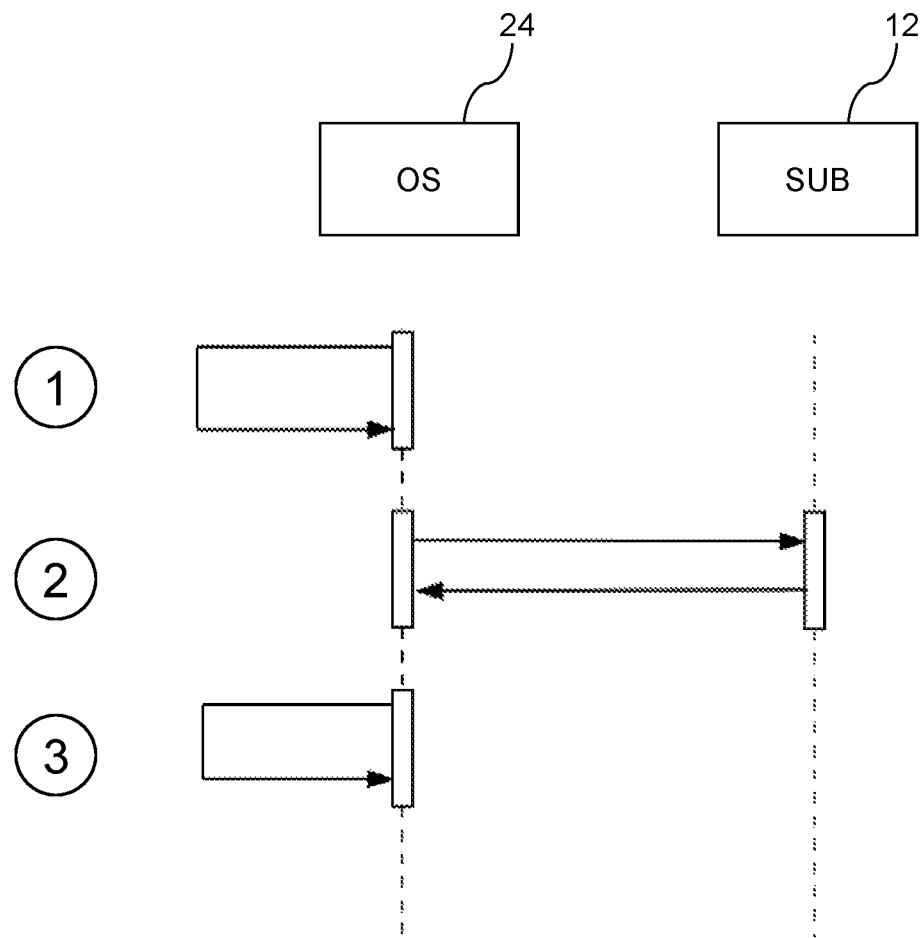
FIG. 7 is a process diagram showing a method of running a diagnostic test.

FIG. 7 illustrates how a container 10 could run a diagnostic test against the blockchain ledger 14 when the container 10 first boots up. Here, in contrast to the method of FIG. 6, the only two components represented in the Figure are the container operating system 24 and the blockchain subsystem 12 of the same container 12. At action (1), the container operating system 24 boots up and runs a diagnostic test by generating cryptographic hashes of target directories. At action (2), the container operating system 24 accesses the blockchain ledger 14 via the blockchain subsystem 12 and compares the values generated from action (1) to those stored in the blockchain ledger 14.

At action (3), the container operating system 24, if the container 10 finds that the values do not match, then takes a defined precautionary action such as a shutdown or firewalling itself from the network 26. In this way, an individual container 10 can detect if any unauthorised access has been made to the container 10 since the last software update. A malicious third party inserting new code into the container 10 will change the directory structure of the container 10 and this will result in new values being generated when hashing of the relevant directories takes place. When a comparison is made with the block 16 for the container 10 in question then the difference in the data stored by the block 16 will be apparent.

The existence and structure of the blockchain ledger 14 protects the individual containers 10, since even if a third party has access to the ledger 14 and can read the content of the block 16 that relates to the container 10 that is being attacked, it is virtually impossible to work backwards from the hash value stored in the block 16 to the actual contents of the directories in the container 10, even if the hashing function(s) used are known. Unauthorised changes made to a container 10, outside of the normal update process, will be detected by the diagnostic test of FIG. 7 and any corruption of the container 10 (for example caused by a hardware failure) will also be detected by the diagnostic test.

Figure 8:
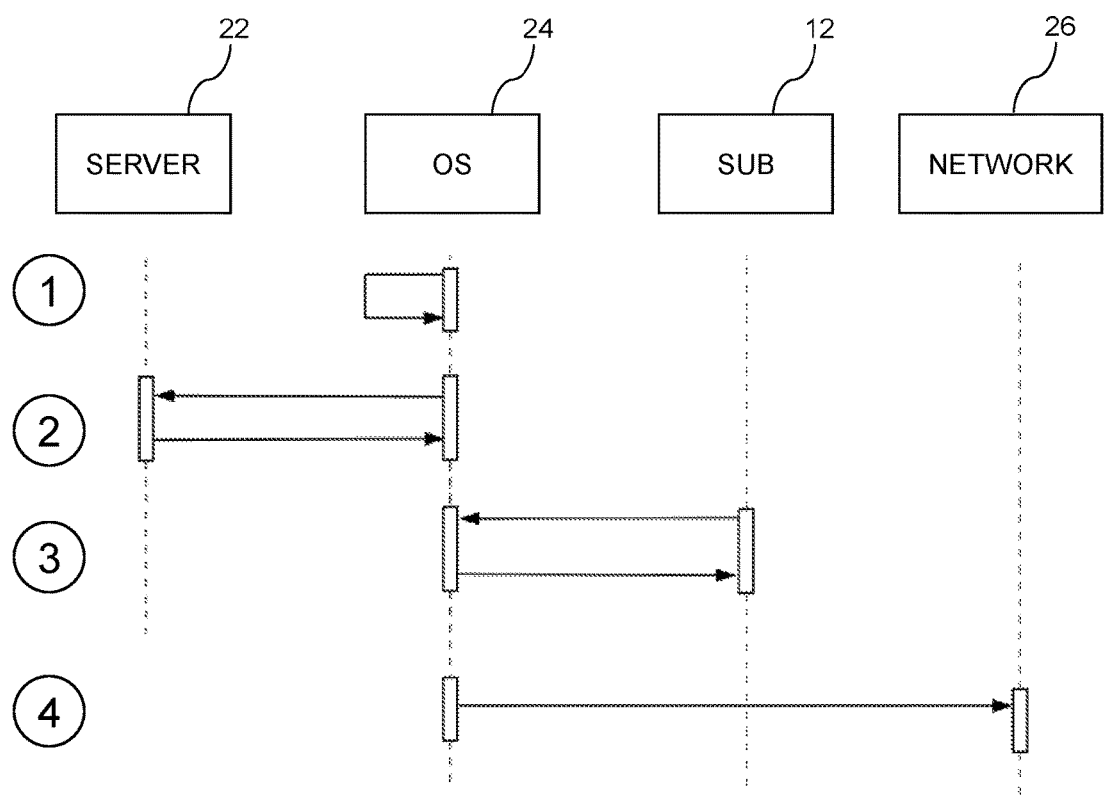
FIG. 8 is a process diagram showing a method of querying a connected container.

FIG. 8 shows how a container 10 can also query the state of another container 10, at any arbitrary point. In this Figure there are four operating components, container operating system 24a of a first container 10, container operating system 24b of a second container 10, a blockchain subsystem 12 of the second container 10 and the network 26. Action (1) of the process comprises container operating system 24b processing data and needing sensitive resources from container operating system 24a. At action (2), container operating system 24b queries container operating system 24a for the current cryptographic hashes of the predefined target directories and container operating system 24a responds with these values.

The next action (3) comprises the container operating system 24b comparing the received values stored in the blockchain ledger 14 for container operating system 24a and here finds that the values do not match. At action (4), the container operating system 24b therefore broadcasts to the network 26 that container operating system 24a may have been compromised and container operating system 24a is firewalled from the other containers 10 in the network 26. This broadcast is in response to the detection that the container operating system 24a is potentially compromised and that other containers 10 in the network 26 should take necessary steps to avoid interaction with the rogue container 10.

The process shown in FIG. 8 allows any container 10 within the network 26 to detect whether another connected container 10 has been altered since the last software update of the connected container 10. The connected container 10 is asked for a hash of the current state of the connected container 10 and this is compared to the last block 16 in the blockchain ledger 14 for that connected container 10. The blockchain ledger 14 is stored locally by every one of the containers 10, since any new block 16 created by a container 10 is always broadcast to the other containers 10 in the network. Therefore, the requesting container 10 will always have access to the actual block 16 for the connected container 10.

Figure 9:
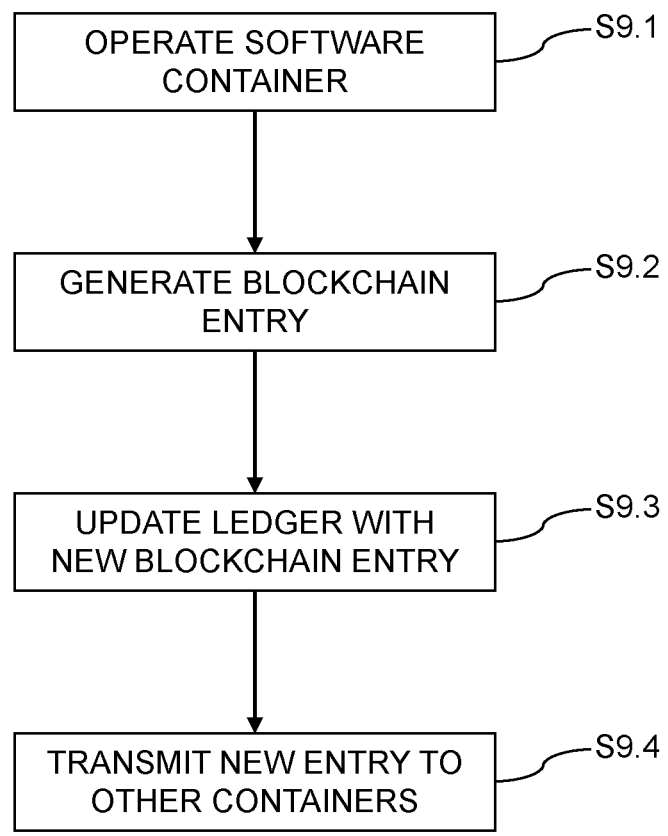
FIG. 9 is a flowchart of a method of operating a software container.

FIG. 9 is a flowchart of a method of operating a software container 10. The first step of the method is step S9.1, which comprises operating the software container 10, where the software container 10 includes a blockchain subsystem 12 and a blockchain ledger 14. The second step of the method is step S9.2, which comprises generating a blockchain entry 16 (a block 16 in the blockchain ledger 14) by executing a hashing function on the current state of the software container 10 and the last entry 16 in the blockchain ledger 14. Preferably, this step of the generation of the blockchain entry 16 immediately follows the updating of the software container 10, which can be used as the trigger for the generation of a new block 16 in the ledger 14.

The next step in the method is step S9.3, which comprises updating the blockchain ledger 14 with the generated blockchain entry 16, and the final step of the method is step S9.4, which comprises transmitting the generated blockchain entry 16 to one or more connected software containers 10. In this way, each software container 10 in the network of containers 10 will periodically generate a new block 16 for storing in the blockchain ledger 14, with the new block 16 being transmitted to all of the other containers 10, so that each container 10 can update their local copy of the blockchain ledger 14. Every container 10 in the network has an up-to-date copy of the blocks 16 that form the blockchain ledger 14.

The generating of the blockchain entry 16 by executing a hashing function on the current state of the software container and the last entry in the blockchain ledger is preferably performed so as to include accessing a predetermined set of directories within the software container and supplying information extracted from the predetermined set of directories to the hashing function. A specific set of directories within the container 10 can be designated as the basis for the hashing function that captures the current state of the container 10. The blockchain subsystem 12 stores the detail of which directories to be used and the relevant hash or hashes of these directories are used in the generation of the block 16.

Figure 10:
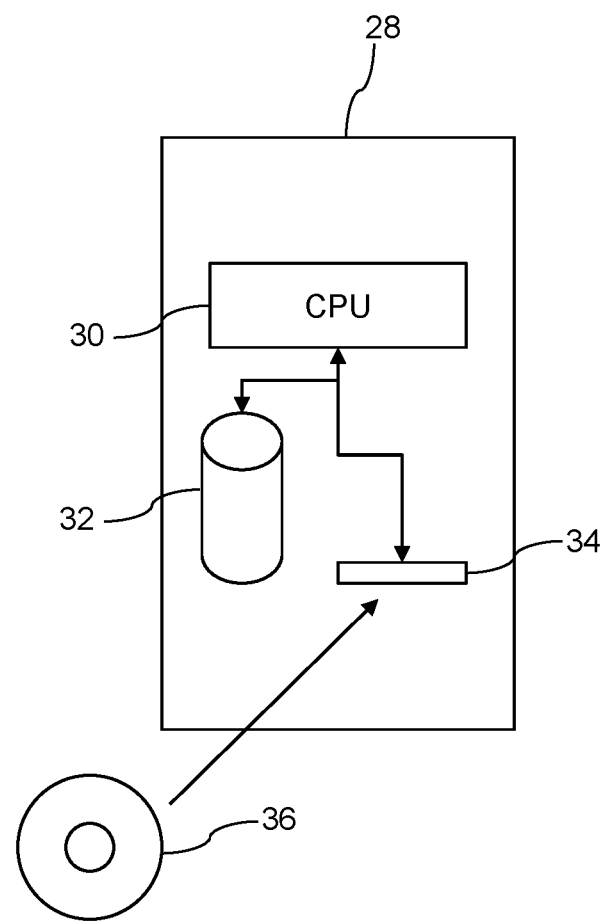
FIG. 10 is a schematic diagram of a computer processing system.

FIG. 10 shows a schematic diagram of a server 28 that can be used to run one or more of the containers 10. The server 28 comprises a processor 30 that is connected to a local storage device 32 and to a local interface 34. A computer readable storage medium 36 is provided, which is a CD-ROM 36 storing a computer program product that can be used to control the processor 30 to operate one or more container 10. The processor 30 of the server 28 executes instructions from the computer program product to operate the containers 10. The server 28 may be running only a single container 10 or may be running multiple independent containers 10. In both cases, the server 28 may be connected to one or more other servers that are also running containers 10 all of which form the network of containers 10 within the organisation.

As discussed in detail above, the container 10 being run by the server 28 can transmit to a connected software container 10 a query for an audit of the current status of the connected software container 10, thereby receiving from the connected software container 10 a response to the transmitted query. The container 10 can then compare the received response to the last entry 16 in the blockchain ledger 14 for the connected software container 10. If the container 10 detects that the received response from the connected software container 10 (in response to the query for an audit of the current status of the connected software container 10) does not match the last entry 16 in the blockchain ledger 14 for the connected software container 10 then the container 10 can transmit a message to all other connected software containers 10 indicating that the queried software container 10 has been compromised.

The present application may be a system, a method, and/or a computer program product at any possible technical detail level of integration. The computer program product may include a computer readable storage medium (or media) having computer readable program instructions thereon for causing a processor to carry out aspects of the present application.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present application may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present application.

Aspects of the present application are described herein with reference to flowchart illustrations and/or block diagrams of methods, apparatus (systems), and computer program products according to embodiments of the application. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present application. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, comprising:
generating a blockchain entry by executing a hashing function on a current state of a software container including a blockchain subsystem and a blockchain ledger and a last entry in the blockchain ledger, wherein the blockchain entry is generated by extracting and providing information from a predetermined set of directories within the software container to the hashing function; and
transmitting the generated blockchain entry to the software container.

2. The method according to claim 1, further comprising:
updating the software container with a software update; and
performing the generation of the blockchain entry responsive to the updating of the software container.

3. The method according to claim 1, further comprising updating the blockchain ledger with the generated blockchain entry.

4. The method according to claim 1, further comprising:
transmitting to the software container a query for an audit of the current state of the software container;
receiving from the software container a response to the transmitted query; and
comparing the received response to the last entry in the blockchain ledger for the software container.

5. The method according to claim 4, further comprising detecting the received response from the software container, in response to the query for the audit of the current state of the software container does not match the last entry in the blockchain ledger for the software container and transmitting a message to all other connected software containers indicating that the queried software container has been compromised.

6. A system, comprising:
a processor configured to:
generate a blockchain entry by executing a hashing function on a current state of a software container including a blockchain subsystem and a blockchain ledger and a last entry in the blockchain ledger, wherein the blockchain entry is generated by extracting and providing information from a predetermined set of directories within the software container to the hashing function; and
transmit the generated blockchain entry to the software container.

7. The system according to claim 6, wherein the processor is further configured to update the software container with a software update, and perform the generation of the blockchain entry responsive to the update of the software container.

8. The system according to claim 6, wherein the processor is further configured to update the blockchain ledger with the generated blockchain entry.

9. The system according to claim 6, wherein the processor is further configured to transmit to the software container a query for an audit of the current state of the software container, receive from the software container a response to the transmitted query and compare the received response to the last entry in the blockchain ledger for the software container.

10. The system according to claim 9, wherein the processor is further configured to detect the received response from the software container in response to the query for the audit of the current state of the software container does not match the last entry in the blockchain ledger for the software container and transmit a message to all other connected software containers indicating that the queried software container has been compromised.

11. A non-transitory computer readable storage medium configured to store program instructions that when executed by a processor causes the processor to:
generate a blockchain entry by executing a hashing function on a current state of a software container including a blockchain subsystem and a blockchain ledger and a last entry in the blockchain ledger, wherein the blockchain entry is generated by extracting and providing information from a predetermined set of directories within the software container to the hashing function; and
transmit the generated blockchain entry to the software container.

12. The non-transitory computer readable storage medium according to claim 11, wherein the processor is further configured to update the software container with a software update and perform the generation of the blockchain entry responsive to the updating of the software container.

13. The non-transitory computer readable storage medium according to claim 11, wherein the processor is further configured to update the blockchain ledger with the generated blockchain entry.

14. The non-transitory computer readable storage medium according to claim 11, wherein the processor is further configured to transmit to the software container a query for an audit of the current state of the software container, receiving from the software container a response to the transmitted query and comparing the received response to the last entry in the blockchain ledger for the software container.

15. The non-transitory computer readable storage medium according to claim 14, wherein the processor is further configured to detect that the received response from the software container, in response to the query for an audit of the current state of the software connecto, does not match the last entry in the blockchain ledger for the software container and transmit a message to all other software containers indicating that the queried software container has been compromised.

16. The method of claim 1, further comprising comparing the state of the software container to a state stored in the blockchain ledger.

17. The method of claim 16, further comprising when the state of the software container is not a same state as the state stored in the blockchain ledger, removing the one or more of the connected software containers from a network.

18. The system of claim 6, wherein the processor is further configured to compare the state of the software container to a state stored in the blockchain ledger.

19. The system of claim 18, wherein when the state of software container is not a same state as the state stored in the blockchain ledger, the processor is further configured to remove the software container from a network.

20. The non-transitory computer readable storage medium of claim 11, wherein the processor is further configured to:
compare the state of the software container to a state stored in the blockchain ledger; and
when the state of the software container is not a same state as the state stored in the blockchain ledger, removing the software container from a network.

* * * * *

UNITED STATES PATENT AND TRADEMARK OFFICE
CERTIFICATE OF CORRECTION

PATENT NO. : 10,599,874 B2  
APPLICATION NO. : 16/180229  
DATED : March 24, 2020  
INVENTOR(S) : Simon J. Brady et al.

Page 1 of 1

It is certified that error appears in the above-identified patent and that said Letters Patent is hereby corrected as shown below:

On the Title Page

Item (72) Inventor - Lines 4-5, listed as:
Gerhard H. Widmayer

Please Correct Inventor name to:
Gerhard A. Widmayer

Signed and Sealed this
Ninth Day of June, 2020

Andrei Iancu
*Director of the United States Patent and Trademark Office*